United States Patent [19]

Boutni

[11] Patent Number: 4,663,391

[45] Date of Patent: May 5, 1987

[54] POLYCARBONATE COMPOSITION EXHIBITING IMPROVED WEAR RESISTANCE

[75] Inventor: Omar M. Boutni, Mt. Vernon, Ind.

[73] Assignee: General Electric Company, Mt. Vernon, Ind.

[21] Appl. No.: 836,769

[22] Filed: Mar. 6, 1986

[51] Int. Cl.⁴ ............................................. C08L 69/00
[52] U.S. Cl. .................................................... 525/146
[58] Field of Search ................ 525/146, 439, 468, 186

[56] References Cited

U.S. PATENT DOCUMENTS 4,220,583  9/1980  Mark ............................... 525/151 X
4,252,916  2/1981  Mark .................................... 525/151
4,454,275  6/1984  Rosenquist .......................... 524/164

*Primary Examiner*—Theodore E. Pertilla
*Attorney, Agent, or Firm*—Myron B. Kapustij; Martin B. Barancik

[57] ABSTRACT

An aromatic carbonate resin composition exhibiting improved wear resistance comprised of, in physical admixture:

(i) at least one aromatic carbonate resin; and
(ii) at least 6 weight percent, based on the total amounts of said aromatic carbonate resin and a partially fluorinated polyolefin present, of at least one partially fluorinated polyolefin.

14 Claims, No Drawings

POLYCARBONATE COMPOSITION EXHIBITING IMPROVED WEAR RESISTANCE

BACKGROUND OF THE INVENTION

The ease and economics of fabricating gears, cams, bearings, slides, ratchets, and the like with injection moldable thermoplastic resins has led to widespread displacement of metals for these applications. In addition to the inherent processing advantages, parts made from these thermoplastic materials have the ability to dampen shock and vibration, reduce part weight, run with less power, provide corrosion resistance, and run quietly. Polycarbonate resins, because of their many excellent physical and mechanical properties such as, for example, toughness, flexibility, impact strength, and high heat resistance, are particularly well suited for this purpose. However, polycarbonate resin parts, akin to other thermoplastic resin parts, are subject to greater wear than comparable metal parts when brought into repeated contact with other moving parts such as those fabricated from metal or thermoplastics.

It would thus be very advantageous if a polycarbonate composition could be provided which, when fabricated into a mechanical moving part, exhibits many of the advantageous properties of conventional neat polycarbonates and also exhibits improved wear resistance.

Attempts have been made to improve the wear resistance of polycarbonate resins by blending them with various other resins. These attempts have generally not been unqualified successes. This is due to the fact that in order to provide useful polycarbonate blends exhibiting improved wear resistance the material admixed with the polycarbonate resin must not only improve the wear resistance of polycarbonate resin but must also be compatible with polycarbonates, i.e., must not significantly adversely affect most of the advantageous properties of polycarbonate, and must be combinable with polycarbonate resin in amounts which are effective to improve the wear resistance of said resin.

Thus, for example, while some materials are both compatible with polycarbonate resins and are combinable therewith over a wide range of concentrations they do not positively upgrade the wear resistance of these resins. Indeed, some of these materials adversely affect the wear resistance of polycarbonates. Other materials, while improving the wear resistance of polycarbonates, are not compatible with polycarbonates or are not combinable therewith in amounts which are effective to improve the wear resistance thereof. Still other materials, while being compatible with polcarbonates and combinable therewith over wide concentrations, need be present in such large amounts in order to positively upgrade the wear resistance that they materially affect and change the basic nature and properties of the polycarbonate.

Thus, in order to provide a useful polycarbonate composition exhibiting improved wear resistance not only is the nature of the material itself critical but its concentration in the blends is also of vital importance.

Furthermore, the degree of effectiveness as a wear improving agent varies greatly among the materials which are compatible with polycarbonate resins, are combinable with polycarbonate resins in amounts which are effective to positively upgrade the wear resistance of polycarbonate resins, and which positively improve the wear resistance of these resins. That is to say some materials are much more effective in positively upgrading the wear resistance of polycarbonate resins than others when admixed with the polycarbonate resin in substantially identical amounts.

There does not appear to be any great degree of predicatbility or certainty as to how a particular material will function, as regards its ability to improve the wear resistance of polycarbonate resins, when said material is admixed with polycarbonates. The empirical approach is generally the rule rather than the exception in this field It is, therefore, an object of the instant invention to provide useful polycarbonate resin compositions which exhibit improved wear resistance when fabricated into gears, cams, bearings, and the like.

U.S. Pat. No. 4,220,583 to Mark discloses translucent and thermally stable polycarbonate compositions comprising an admixture of an aromatic polycarbonate and a minor amount, i.e., from about 0.01 to about 5 weight percent based on the weight of the polycarbonate composition, of a partially fluorinated polyolefin. Mark did not recognize that blends of polycarbonate resin and amounts of partially fluorinated polyolefin in excess of 5 weight percent have improved resistance to wear.

SUMMARY OF THE INVENTION

The instant invention is directed to polycarbonate compositions exhibiting improved wear resistance. More particularly, the instant invention is directed to polycarbonate compositions comprising, in physical admixture, (i) at least one aromatic polycarbonate resin, and (ii) an amount effective to improve the wear resistance of said polycarbonate resin of at least one partially fluorinated polyolefin.

DESCRIPTION OF THE INVENTION

It has been discovered that the wear resistance of parts formulated from polycarbonate resin can be improved by admixing with the polycarbonate resin a wear resistance improving amount of a partially fluorinated polyolefin. These parts may be, inter alia, gears, cams, bearings, slides, and ratchets which come in contact with other parts which may be fabricated from thermoplastics or metals.

The polycarbonate resins utilized in the instant invention are conventional well known resins which are generally commercially available or may be readily prepared by well known conventional methods. These polycarbonates, as well as methods for their preparation, are described inter alia in U.S. Pat. Nos. 3,161,615, 3,220,973, 3,312,659, 3,312,660, 3,313,777, 3,666,614 and 3,939,672, all of which are incorporated herein by reference. The polycarbonate resins may be conveniently prepared by the interfacial polymerization process by the coreaction of at least one dihydric phenol with a carbonate precursor. Typically, the dihydric phenols utilized may be represented by the general formula

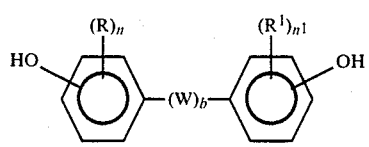

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

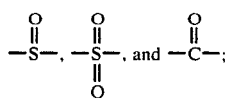

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals contain from 4 to about 8 ring carbon atoms. The preferred aryl radicals contain from 6 to 12 ring carbon atoms, i.e., phenyl, biphenyl, and naphthyl. The preferred aralkyl and alkaryl radicals contain from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those that contain from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of dihydric phenols of Formula I include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl);
4,4'-thiodiphenol; and
bis(4-hydroxyphenyl)ether.

Other dihydric phenols which are useful are described in U.S. Pat. Nos. 2,998,835, 3,028,365 and 3,334,154, all of which are incorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl) carbonate, di(chlorophenyl)carbonate, and di(tribromophenyl)carbonate; di(alkylphenyl) carbonates such as di(tolyl)carbonate; di (naphthyl)carbonate, chlorophenyl chloronaphthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

A convenient process for the preparation of the instant polycarbonates is the interfacial polymerization process. The interfacial polymerization process utilizes two different solvent media which are immiscible. One solvent medium is an aqueous basic medium. The other solvent medium is an organic medium, such as methylene chloride, which is immiscible in said aqueous medium. Also employed in the interfacial polymerization process are molecular weight regulators which control the chain length or molecular weight of the carbonate polymer by a chain terminating mechanism, and catalysts. The molecular weight regulators are well known in the art and include, but are not limited to, phenol itself, p-cumylphenol, n-octylphenol, p-tertiarybutyl phenol, and Chroman I. The catalysts are also well known in the art and include, but are not limited to, tertiary amines such as triethylamine, quaternary ammonium compounds such as tetraethyl-ammonium bromide, and quaternary phosphonium compounds such as n-butyltriphenyl phosphonium.

Also included within the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds contain at least three functional groups which may be carboxyl, hydroxyl, carboxylic anhydride, haloformyl, and mixtures thereof. Some illustrative none-limiting examples of the aromatic polyfunctional compounds that may be employed as branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

Also included within the scope of the instant invention are the copolyester-carbonate resins. These copolyester-carbonate resins are well known in the art and are described, inter alia, in U.S. Pat. No. 3,169,121, which is hereby incorporated herein by reference. These copolyester-carbonates may be readily prepared by the coreaction of at least one dihydric phenol, at least one carbonate precursor, and at least one ester precursor which may be a difunctional carboxylic or an ester forming reactive derivative thereof such as an acid dihalide.

The partially fluorinated polyolefins are well known compounds which are generally commercially available or may be readily prepared by known methods. The partially fluorinated polyolefins of the instant invention include, but are not limited to, poly(vinylidene fluoride), poly (vinyl fluoride), poly(trifluoroethylene), poly(chlorotrifluoroethylene) and poly(trifluoroethylene alkali metal sulfonate).

The partially fluorinated polyolefins which are useful in the present invention, as well as methods for their preparation, are described inter alia in Billmeyer, Fred W., Jr., Textbook of Polymer Science, Interscience Publishers, New York, N.Y., 1966, pp. 425–427; Monermoso, J.C., Rubber Chem. Tech., 34, 1521 (1961); and Rudner, M.A., Fluorocarbons, Reinhold Publishing Corp., New York, N.Y., all of which are incorporated herein by reference.

Thus, for example, poly(chlorotrifluoroethylene) may be prepared by first preparing the chlorotrifluorethylene monomer by the dechloronation of the trichlorotrifluorethane monomer and then polymerizing it in an aqueous system using a redox initiator.

In order to provide useful polycarbonate blends exhibiting a useful degree of wear resistance the amount of said partially fluorinated polyolefin present in the blends is critical. If too little, e.g., less than about 5 weight percent, of said polyolefin is present the blends will not exhibit a sufficient degree of improvement in wear resistance to be useful for many commercial applications. If too much of said polyolefin is present the blends will loose, to a substantial degree, many of the advantageous properties imparted thereto by the polycarbonate. The amount of said polyolefin present in the blends is from at least about 6 to about 35 weight percent based on the total amounts of polycarbonate and said polyolefin present, preferably from about 7 to about 30 weight percent, and more preferably from about 8 to about 20 weight percent. Generally, if more than about 35 weight percent of the partially fluorinated polyolefin is present in the polycarbonate composition the advantageous physical properties imparted to said composition by the polycarbonate resin begin to be significantly deleteriously affected.

It is to be understood that the instant compositions may contain only one partially fluorinated polyolefin or they may contain a mixture of two or more different partially fluorinated polyolefins, so long as the amount of partially fluorinated polyolefins present in the instant compositions falls within the aforedescribed limits.

The compositions of the instant invention may optionally contain the commonly known and used additives such as, for example, antioxidants; antistatic agents; mold release agents; fillers such as glass, talc, mica, and clay; ultraviolet radiation stabilizers such as the benzophenones, benzotriazoles, and cyanoacrylates; colorants; hydrolytic stabilizers such as the epoxides disclosed in U.S. Pat. Nos. 3,489,716, 4,138,379 and 3,839,247, all of which are incorporated herein by reference; color stabilizers such as the organophosphites; and flame retardants.

Some particularly useful flame retardants are the alkali and alkaline earth metal salts of organic sulfonic acids which are described, inter alia, in U.S. Pat. Nos. 3,933,734, 3,931,100, 3,978,024, 3,948,851, 3,926,908, 3,919,167, 3,909,490, 3,953,396, 3,953,399, 3,917,599, 3,951,910 and 3,940,366, all of which are incorporated herein by reference.

DESCRIPTION OF THE PREFERRED EMBODIMENT

The following examples are set forth to further illustrate the present invention and are not to be considered as limiting the invention thereto. These examples are set forth by way of illustration and not limitation. Unless otherwise specified all parts and percentages are parts and percentages by weight.

The following examples fall outside the scope of the instant invention and are presented for comparative purposes only.

EXAMPLE 1

A polycarbonate resin (comprised of the reaction products of bisphenol-A and phosgene) is injection molded into plaques and these plaques are then machined into test washers measuring about 1.12 inches in total diameter and 0.12 inches thick at the rim. The rim extends laterally along the radius a distance of 0.109 inch. The remainder of the disc is 0.062 inch thick. The hole in the center of the disc has a diameter of 0.28 inch. The test disc is pictured in the February 6 issue of Machine Design at page 71.

The wear factor K is determined for these washers. The wear factor is measured using the Thrust Washer machine, formerly known as LFW-6, which is described in detail in Modern Plastics, Vol. 49, No. 11, page 114 (1972). Briefly stated, this machine utilizes a steel washer which is in rotational contact with a test washer machined from the material to be tested. The applied pressure and the velocity of the rotating steel washer can be varied. In this test the velocity used is 50 feet per minute and the pressure is 40 psi.

The wear factor K is determined in accordance with the following equation:

$$K = \frac{W}{FVT}$$

wherein W represents the volume wear (amount of material by volume removed from the test washer): F represents the force or pressure, in pounds, applied by the steel washer onto the test washer; V represents the rotational velocity in feet per second; and T represents the elapsed time that the two washers are in rotational contact with each other. The lower the K value the better the resistance to wear of the test washer.

The results of this test are set forth in Table I.

EXAMPLE 2

A blend containing 95 parts by weight of the polycarbonate resin of Example 1 and 5 parts by weight of a partially fluorinated polyolefin (Penwalt's KYNAR 461) is prepared by thoroughly mixing together the polycarbonate resin and the partially fluorinated polyolefin. The resulting blend is formed into test washers substantially in accordance with the procedure of Example 1. The K value of the washers formed from this blend is determined and the results are set forth in Table I.

The following example illustrates a blend of the instant invention.

EXAMPLE 3

A blend containing 93 parts by weight of the polycarbonate resin of Example 1 and 7 parts by weight of the partially fluorinated polyolefin of Example 2 is prepared by thoroughly mixing the polycarbonate resin and the partially fluorinated polyolefin together. The resultant blend is formed into a test washers substantially in accordance with the procedure of Example 1. The K value of the washers is determined and the results are set forth in Table I.

TABLE I

| Example No. | K $(1 \times 10^{-7})$ |
|---|---|
| 1 | immediate failure |
| 2 | 37.4 |

TABLE I-continued

| Example No. | K ($1 \times 10^{-7}$) |
| --- | --- |
| 3 | 21.1 |

As illustrated by the data in Table I the improvement in wear resistance of a blend of the instant invention (Example 3) is more than 43% as compared with a prior art blend (Example 2). This is indeed surprising since the blend of Example 3 contains only 2 weight percent more partially fluorinated polyolefin than the blend of Example 2. Furthermore, the blend of Example 3, which has only slightly more partially fluorinated polyolefin than does the blend of Example 2, exhibits substantially the same properties as the blend of Example 2, with the exception of possessing greatly improved wear resistance.

In a preferred embodiment of the instant invention the blends of polycarbonate resin and partially fluorinated polyolefin do not contain any mineral fillers such as glass, talc, and the like, particularly glass fillers.

Obviously, other modifications and variations of the instant invention are possible in light of the above teachings. It is, therefore, to be understood that changes may be made in the particular embodiments described above which are within the full intended scope of the invention as defined by the appended claims.

What is claimed is:

1. An aromatic carbonate resin composition exhibiting improved wear resistance comprised of, in physical admixture:
   (i) at least one aromatic carbonate resin; and
   (ii) an amount effective to improve the wear resistance of said aromatic carbonate resin of at least one partially fluorinated polyolefin, said amount being from about 7 to about 35 weight percent, based on the total amounts of said aromatic carbonate resin and said partially fluorinated polyolefin present.

2. The composition of claim 1 which contains from about 8 to about 20 weight percent of said partially fluorinated polyolefin.

3. The composition of claim 1 wherein said partially fluorinated polyolefin is selected from poly(vinylidene fluoride), poly(vinyl fluoride), poly(trifluoroethylene), poly(chlorotrifluoroethylene), poly(trifluoroethylene alkali metal sulfonate), or mixtures thereof.

4. The composition of claim 1 wherein said carbonate resin is a polycarbonate resin, 5. The composition of claim 4 wherein said polycarbonate resin contains the reaction products of at least one dihydric phenol and a carbonate precursor.

6. The composition of claim 5 wherein said carbonate precursor is phosgene.

7. The composition of claim 6 wherein said dihdyric phenol is bisphenol-A.

8. The composition of claim 5 which further contains a flame retardant amount of at least one flame retardant compound.

9. The composition of claim 1 wherein said carbonate resin is a copolyester-carbonate resin.

10. The composition of claim 9 wherein said copolyester-carbonate resin contains the reaction products of at least one dihydric phenol, at least one ester precursor, and a carbonate precursor.

11. The composition of claim 10 wherein said ester precursor is selected from aromatic difunctional carboxylic acids or their ester forming reactive derivatives.

12. The composition of claim 11 wherein said carbonate precursor is phosgene.

13. The composition of claim 12 wherein said dihydric phenol is bisphenol-A.

14. The composition of claim 10 which further contains a flame retardant amount of at least one flame retardant compound.

* * * * *